UNITED STATES PATENT OFFICE.

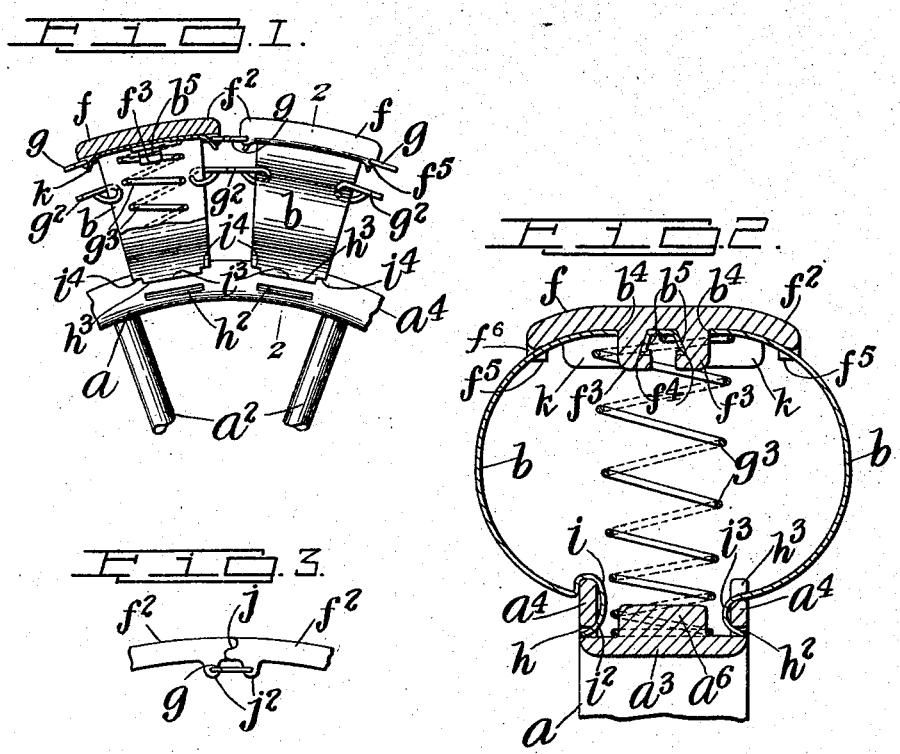

RICHARD WUNNING, OF NEW YORK, N. Y.

VEHICLE-WHEEL RIM AND TIRE CONSTRUCTION.

1,185,860.      Specification of Letters Patent.      Patented June 6, 1916.

Application filed February 1, 1915. Serial No. 5,347.

*To all whom it may concern:*

Be it known that I, RICHARD WUNNING, a citizen of the United States, and residing at New York, in the county of New York and State of New York, have invented certain new and useful Improvements in Vehicle-Wheel Rim and Tire Constructions, of which the following is a specification, such as will enable those skilled in the art to which it appertains to make and use the same.

This invention relates to vehicle wheel rim and tire constructions, and the object thereof is to provide a construction of this class which will obviate the necessity of using rubber or similar tubes and shoes, and which may be easily repaired when necessary, and which will also be comparatively inexpensive; and with this and other objects in view the invention consists in a wheel rim and tire constructed and operating as hereinafter described and claimed.

The invention is fully disclosed in the following specification, of which the accompanying drawing forms a part, in which the separate parts of my improvement are designated by suitable reference characters in each of the views, and in which:—

Figure 1 is a sectional side view of a part of a wheel rim and tire construction made according to my invention; Fig. 2 a radial section on the line 2—2 of Fig. 1 and on an enlarged scale; and, Fig. 3 a side view of a detail of the tire construction only and showing a modification.

In the practice of my invention, I provide a wheel, comprising a rim $a$ and spokes $a^2$ which connect the rim with the hub, but as the hub and spokes form no part of my invention said hub is not shown.

The rim $a$ is U-shaped in form in cross section and comprises an inner annular plate member $a^3$ and annular side flanges $a^4$ and, in connection therewith, I employ a tire construction involving a tread portion and spring loop or bow members $b$ arranged radially and transversely of the rim and composed of sheet metal and open at the inner side, and which are connected with the rim as hereinafter described.

The side flanges $a^4$ of the rim are provided one with a single row of circumferential oblong apertures $h$ closely adjacent to the annular rim member $a^3$ and the other with a corresponding row of apertures $h^2$ and with recesses $h^3$ in its outer edge, and the loop or bow members $b$ are provided at one side with, or are formed into, supplemental loops $i$ which engage the corresponding side flange $a^4$ of the rim and the ends $i^2$ of which are passed outwardly through the apertures $h$, while the other side portions of the loop or bow members $b$ are formed into tongues $i^3$ which are passed inwardly through the recesses $h^3$ and outwardly through the apertures $h^2$, and this construction provides the inner end portions of the loop or bow members with shoulders $i^4$ which bear on the outer sides of the flange members $a^4$ of the rim. The annular rim member $a^3$ is also provided at intervals with outwardly directed bosses $a^6$ which are inclosed by the inner ends of spiral springs $g^3$ placed in the loop or bow members, and said bosses hold said spiral springs in position or aid in doing so.

The tread or tire proper is shown at $f$ and consists of separate blocks $f^2$ which are placed on the outer parts of the spring loop or bow members $b$, and which may be composed of any suitable material and which are connected circumferentially by links or similar devices $g$.

The loop or bow members $b$ are provided centrally of their outer surfaces with apertures $b^4$ having inwardly directed and outwardly diverging tongues or prongs $b^5$, and the blocks $f^2$ are provided with inwardly directed lugs or projections $f^3$ which pass through the apertures $b^4$ and are provided on their inner sides with recesses $f^4$ which receive the spring tongues or prongs $b^5$ when the lugs or projections $f^3$ are forced inwardly in the operation of connecting the tread blocks $f^2$ with the loop or bow members $b$.

The tread blocks $f^2$ are slightly concave on their inner surfaces and are provided on their outer side edges with inwardly directed flanges $f^5$ having transverse recesses $f^6$ in which the spring loop or bow members $b$ fit, and this construction securely binds the tread blocks $f^2$ to said spring loop or bow members. The spring loop or bow members $b$ are also connected inwardly of the tread or tire proper by side links or similar devices $g^2$, and the spiral springs $g^3$ or the outer ends thereof encircle the lugs or projections $f^3$ and bear on the inner surfaces of the outer parts of the loop or bow members $b$.

A tire made in this manner will possess all the elastic or spring qualities of pneumatic tires and other spring or elastic tires of this class, and may be used wherever such tires are required and may be easily repaired at any time if the separate parts thereof should be broken, or injured in use.

In Fig. 3, I have shown a modification in which the separate parts or blocks $f^2$ of the tread member are provided with interlocking joints $j$ and with inwardly directed lugs or projections $j^2$ with which the link devices $g$ are connected, and this construction provides for a continuous tread member without interfering with the flexibility or radial movement thereof, or the separate parts thereof, which movement is necessary in the operation of a wheel made according to my invention.

The loop or bow members $b$ which are composed of sheet metal are provided at their outer side edges and inwardly of the tread blocks or members $f^2$ with inwardly directed flanges $k$ and the tread blocks $f^2$ are provided with inwardly directed lugs or projections $f^5$ with which the links $g$ are connected.

My invention is not limited to the details of construction herein shown and described, and changes therein and modifications thereof may be made, within the scope of the appended claims without departing from the spirit of the invention or sacrificing its advantages.

Having fully described my invention, what I claim as new and desire to secure by Letters Patent, is:—

1. In a wheel rim and tire construction, a rim, radially and transversely arranged spring loop or bow members open at their inner sides and connected with said rim, and a flexible tread member composed of a plurality of parts and surrounding said bow members, said tread member and bow members being provided, one with parts which are passed through the other, and said other with spring devices which engage said parts for holding said tread member in connection with said bow members.

2. In a wheel rim, and tire construction, a rim, radially arranged spring loop or bow members open at their inner sides and the separate side portions of which are connected with said rim, and a flexible tread member provided with lugs or projections which are adapted to pass through said loop or bow members and to be engaged by spring members formed from said loop or bow members.

In testimony that I claim the foregoing as my invention I have signed my name in presence of the subscribing witnesses this 28th day of January, 1915.

RICHARD WUNNING.

Witnesses:
C. MULREANY,
H. E. THOMPSON.

Copies of this patent may be obtained for five cents each, by addressing the "Commissioner of Patents, Washington, D. C."